United States Patent [19]

Chandler et al.

[11] 4,036,996

[45] July 19, 1977

[54] PROCESS FOR THE PRODUCTION OF AN IMPROVED SIMULATED CASEIN FROM PROTEINACEOUS MIXTURES

[75] Inventors: Keith L. Chandler, Algonquin; Roy G. Hyldon, Crystal Lake; Surinder Kumar, Buffalo Grove; John P. O'Mahony, Crystal Lake, all of Ill.

[73] Assignee: The Quaker Oats Company, Chicago, Ill.

[21] Appl. No.: 680,096

[22] Filed: Apr. 26, 1976

[51] Int. Cl.² ............................................. A23J 3/00
[52] U.S. Cl. .................................. 426/254; 426/656; 260/112 R; 260/123.5
[58] Field of Search .............. 426/656, 657, 253, 254; 260/112 R, 112.6, 123.5, 253, 254, 656, 112 G, 123.5

[56] References Cited

U.S. PATENT DOCUMENTS

| | | | |
|---|---|---|---|
| 3,879,370 | 4/1975 | Carpenter et al. | 426/657 |
| 3,917,877 | 11/1975 | Kumar et al. | 426/656 |
| 3,917,878 | 11/1975 | Kumar et al. | 426/656 |
| 3,917,879 | 11/1975 | Kumar et al. | 426/656 |
| 3,930,058 | 12/1975 | Kumar et al. | 426/656 |

*Primary Examiner*—Raymond N. Jones
*Assistant Examiner*—R. A. Yoncoskie
*Attorney, Agent, or Firm*—Charles J. Hunter

[57] ABSTRACT

A process is disclosed for producing an improved modified plant protein having thermoplastic and forming properties similar to casein and caseinate salts. The process comprises making an aqueous slurry of a plant protein material and an alkali metal carbonate, adjusting the pH, reacting the carbonate with the protein, admixing the slurry with a peroxide, neutralizing the slurry, removing steam volatile flavor components, drying the neutralized slurry, and then blending the dried modified proteinaceous slurry with an unmodified proteinaceous material. The process produces a product which is improved in odor, taste and color.

13 Claims, No Drawings

PROCESS FOR THE PRODUCTION OF AN IMPROVED SIMULATED CASEIN FROM PROTEINACEOUS MIXTURES

BACKGROUND OF THE INVENTION

1. Field of the Invention

This invention relates to a process for producing an improved modified plant protein having thermoplastic and forming properties similar to casein and caseinate salts. The process involves the reaction of an alkali metal carbonate with plant protein to produce a reaction product. Peroxide is then added to the reaction product and the peroxide containing reaction product is then neutralized. The reaction product is then heated under a vacuum.

2. Description of the Prior Art

Casein, a milk protein, and its salts are used extensively in the food industry to manufacture fabricated food products. One of the major reasons for the popularity of casein and caseinate salts in fabricated foods is its unique functional properties such as high water solubility and the thermoplastic behavior of caseinate-water mixtures. By thermoplastic behavior, in this context, is meant the ability of a protein dough to flow freely like a liquid upon application of heat and a return to a semi-solid elastic mass upon cooling to ambient temperatures. Unmodified plant proteins generally lack this property and therefore cannot be used as a functional replacement of caseinate salts although the cost considerations favor their use. U.S. Pat. Nos. 3,917,877, 3,917,878, 3,917,879, and 3,930,058 have described processes used to modify plant proteins to simulate the thermoplastic properties of casein or caseinate salts. In all of the processes taught in the above patents, unmodified plant protein was treated with alkali. The alkali treatment of plant protein produces a product having a muddy green color and a strong odor characteristic of hydrogen sulfide. It has been observed that the color, odor and flavor of the alkali treated plant protein is highly objectionable and undesirable.

We have now developed a process by which the flavor and color of alkali-modified plant protein can be improved to yield a protein of highly desirable creamy white color and bland flavor. According to the developed process, the alkali-modified solution of plant protein or a mixture of plant and animal protein is reacted with a peroxide solution, followed by removal of steam volatile flavor components. The latter may be accomplished by heating the peroxide treated protein solution under a vacuum and removing the vapors. The relative amount of peroxide added and the time and temperature of peroxide treatment determine the extent of improvement in color, odor and flavor.

SUMMARY OF THE INVENTION

It is an object of this invention to provide a process for producing a modified plant protein with improved odor, taste, and color, having the thermoplastic and binding properties of casein and caseinate salts.

The object of this invention is accomplished by a process for producing a modified plant protein having properties similar to casein and caseinate salts and having improved odor, taste and color, said process comprising:

a. making an aqueous slurry of a vegetable protein material, said plant protein material containing at least about 30 percent by weight protein;

b. adjusting the pH of the aqueous slurry to a pH in the range of from about 7.0 to about 10.5 by addition thereto of an alkali metal carbonate;

c. heating the aqueous slurry to react the alkali metal carbonate with the protein;

d. cooling the slurry to a temperature within the range of from about 60° F. to 130° F.

e. adding from about 0.3 percent to about 2.0 percent by weight peroxide to the slurry per pound of protein;

f. mixing the peroxide containing slurry;

g. neutralizing the slurry to a pH of from 6.6 to 7.0 by addition thereto of an edible acid;

h. thereafter, heating the slurry under a vacuum to remove steam-volatile flavor substances;

i. drying the neutralized slurry to remove a substantial portion of the water therein; and j. admixing from 1 to 15 parts by weight of the neutralized and modified slurry with from 1-30 parts by weight unmodified proteinaceous material.

The object of this invention is also accomplished by a process for producing a modified plant protein having properties similar to casein and caseinate salts and having improved odor, taste and color, said process comprising:

a. making an aqueous slurry of a vegetable protein material, said plant protein material containing at least about 30 percent by weight protein;

b. adjusting the pH of the aqueous slurry to a pH in the range of from about 7.0 to about 10.5 by addition thereto of an alkali metal carbonate;

c. heating the aqueous slurry to react the alkali metal carbonate with the protein;

d. cooling the slurry to a temperature within the range of from about 60° F. to 130° F.

e. adding from about 0.3 percent to about 2.0 percent by weight peroxide to the slurry per pound of protein;

f. mixing the peroxide containing slurry;

g. neutralizing the slurry to a pH of from 6.6 to 7.0 by addition thereto of an edible acid;

h. thereafter, heating the slurry under a vacuum to remove steam-volatile flavor substances; and i. admixing from 1 to 15 parts by weight of the neutralized and modified slurry with from 1-30 parts by weight unmodified proteinaceous material.

Preferably, the process includes a cooling step, say down to a range of from about 60° F. to 130° F., after the heating-reacting step and prior to the neutralization step.

More preferably the protein material of this invention is a solvent extracted oil seed vegetable protein.

It is also preferable that the aqueous slurry of this invention has a solids contents of about 3 percent to about 18 percent by weight, and a protein content up to about 12 percent by weight.

The preferred alkali metal carbonate of this invention is a member selected from the group comprising sodium carbonate, sodium bicarbonate, potassium carbonate, and potassium bicarbonate.

The preferred peroxide of this invention is a member selected from the group consisting of hydrogen peroxide, sodium peroxide, potassium peroxide, calcium peroxide and magnesium peroxide.

The preferred reaction temperature of this invention is a temperature of from 280° F. to 370° F in a closed vessel for 2½ to 5 minutes.

DETAILED DESCRIPTION OF THE INVENTION

The first step in this invention requires making an aqueous slurry of a plant protein material. Preferably, the protein material is an oil seed, solvent extracted, plant protein such as soy protein isolate or soy protein concentrate. Other proteins, however, such as oat protein, have been found to be highly acceptable for use in this invention. Other oil seed vegetable proteins, solvent extracted to concentrate the protein therein are also acceptable, such as peanut and sesame protein and the other oil seed vegetable proteins. It is preferred that the protein material contain at least about 30 percent by weight protein.

The aqueous slurry is prepared simply by adding the proteinaceous material to water and mixing until a slurry is provided. Preferably the slurry is prepared by mixing from 3 to 18 percent by weight of the proteinaceous material in water and mixing until a slurry is formed. This preferably gives an overall protein content in the slurry of up to about 12 percent by weight.

The next step in the invention requires adjusting the pH of the aqueous slurry to a pH in the range of from about 7.0 to about 10.5 by addition thereto of an alkali metal carbonate. It is important and critical to the invention that the aqueous slurry have a pH above 7.0 in order to carry out the complete process of this invention. This can generally be accomplished by adding from about 0.5 to 4.0 percent by weight of the alkali metal carbonate. By use herein of the term "alkali metal carbonate" it is intended to mean the term with its well known use consisting of the carbonates of the alkali metals as well as the bicarbonates or acid carbonates thereof. For instance, sodium carbonate and potassium carbonate are highly acceptable in this invention as well as sodium bicarbonate and potassium bicarbonate. It is within the purview of one skilled in the art that he might achieve the desired pH range by addition of the carbonate. It is preferable that the pH be adjusted between 7.2 and 10.5. A pH of about 8 is highly preferable.

After the pH has been adjusted by addition of an alkali metal carbonate the aqueous slurry is heated to react the alkali metal carbonate with the protein. The heating must be sufficient to provide a reaction between the carbonate and the protein but must be below the decomposition temperature of the protein. We have found, for instance, that the 330° F. reaction temperature in an enclosed vessel for a time period of from 160–200 seconds produces an acceptable product. We have also found that a temperature from 295° F. to 310° F. for from 3.5 to 5 minutes produces a good product. Other times and temperatures may also be utilized, providing the reaction product when neutralized has the same properties as herein attributed to the above-described reaction. It is well within the skill of one knowledgeable in the art to prepare these different products with different reactions in order to arrive at an end product. However, the optimum conditions are as stated above. In any condition, the temperature should be at least above the boiling point of water up to a point at which degradation of the protein material or reaction product occurs. It is preferable that the reaction be conducted in a closed vessel since this enables heating of the aqueous slurry above the boiling point of water. Generally this will raise the pressure of the reaction to something around 90 pounds per square inch but this is acceptable in producing a desirable product.

At this point in the process, it is preferable to cool the reacted mass. This can be accomplished by conventional means to arrive at a temperature of from about 60° F. to 130° F.

The next step in this invention requires the addition of a peroxide to the slurry. The peroxide containing slurry is then thoroughly mixed. The peroxide can be a member selected from the group consisting of hydrogen peroxide, sodium peroxide, potassium peroxide, calcium peroxide and magnesium peroxide. The relative amount of the peroxide added and the time and temperature of peroxide treatment will determine the extent of improvement in color, odor and flavor. It is preferable that from about 0.3 percent to about 2.0 percent by weight peroxide is added per pound of protein. It is also preferable to add the peroxide to the slurry when the slurry is at room temperature.

The next step in this invention requires the neutralizing of the slurry to a pH of from 6.6 to 7.0 by addition thereto of an edible acid. It is critical that the neutralization produce a pH within the stated range. A much lower pH will cause precipitation of the protein. The neutralization can occur by use of any of the known edible acids which are normally used as food additives. For instance, hydrochloric acid, citric acid, formic acid and acetic acid, are all members of the group of edible food grade acids acceptable for use in this invention.

After the slurry has been neutralized and the peroxide has been added, the slurry is heated to remove the steam volatile flavor components. The removal of the steam volatile flavor components can be accomplished much faster if the slurry is heated under a vacuum, in the range of from about 15 inches to about 30 inches and at a temperature sufficient to accomplish boiling. Preferably, the steam volatile flavor components are removed from the slurry by heating the slurry to a temperature of 150° F. under a vacuum of 22 inches. By use herein of the term "steam volatile flavor components" it is intended to mean those substances that have a boiling point lower than that of water and which impart objectionable flavors and odors to the alkali modified protein.

After neutralization of the slurry and the removal of the steam volatile flavor substances, the slurry is then dried to remove a substantial portion of the water. The moisture content of the final product should be about 15 percent by weight moisture or lower. Drying can occur in any of the common commercial processes such as drum drying, spray drying, or freeze drying, and either process is acceptable for use in this invention.

The final step in this process requires admixing from 1 to 15 parts by weight of the neutralized slurry with from 1 to 30 parts by weight unmodified proteinaceous material. The unmodified proteinaceous material refers to proteinaceous material that is not modified according to the process hereinabove described with relation to modification by alkali metal carbonate treatment. The unmodified proteinaceous material may refer to either plant proteins or animal proteins. In other words, the unmodified proteinaceous material can refer to the oil seed vegetable proteins that are solvent extracted such as soy protein concentrate, soy protein isolate, or it may refer to oat protein, peanut protein, or sesame protein which has been unmodified or it may also refer to meat protein such as meaty materials, or to fish protein such as fish flour or fish meal. In other words, the normally acceptable usage of the term "proteinaceous material" is acceptable for admixture herewith to produce an acceptable product.

DESCRIPTION OF THE PREFERRED EMBODIMENTS

This invention may be more fully described, but is not limited by the following examples.

EXAMPLE 1

An aqueous slurry of approximately 6 percent by weight soy protein isolate was prepared by mixing about twenty pounds of soy protein isolate with about 38 gallons of water at ambient temperature. About 315 grams of sodium carbonate was slowly added to the slurry to achieve a pH of approximately 8.0. The protein slurry was then heated at 300° F. for 4 minutes and cooled to ambient temperature. The resulting protein solution had a muddy green color and a strong odor characteristic of hydrogen sulfide. Two hundred milliliters of 30 percent hydrogen peroxide was added to the material and the contents were mixed for 30 minutes. The pH of the protein solution was adjusted to 7.0 with 1N hydrochloric acid and the solution was pumped into a single stage vacuum evaporator. The solution was heated at 150° F. under a vacuum of 22 inches, and the resulting vapors were removed. The evaporation was continued until the volume in the evaporator was reduced to approximately half the original volume. The concentrated slurry was yellowish white in color and had a bland flavor and odor. The product was then dried in a spray drier until the moisture content thereof was less than 15 percent by weight. The dried slurry resembled a creamy white powder with bland flavor and odor. The dried slurry was then admixed with unmodified soy protein concentrate in an amount of 3 parts by weight soy protein concentrate to 1 part by weight dried slurry and extruded into a fibrous product having properties similar to casein.

EXAMPLE 2

A procedure similar to that in Example 1 was used except that the pH of the alkali-modified slurry was adjusted to 7.0 before adding hydrogen peroxide.

EXAMPLE 3

Same as Example 1 except that 100 grams of sodium peroxide was mixed with the alkali-modified protein in place

EXAMPLE 4

Same as Example 2 except that 100 grams of sodium peroxide was added in place of hydrogen peroxide.

EXAMPLE 5

Example 1 is repeated with the exception that the alkali metal carbonate is potassium carbonate. Again, an acceptable product is produced.

EXAMPLE 6

Example 1 is repeated except the modified plant protein material is oat protein. Again, an acceptable product is produced.

EXAMPLE 7

Example 5 is repeated with the exception that the modified plant protein material is oat protein. Again, an acceptable product is produced.

EXAMPLE 8

Example 1 is repeated except the modified plant protein material is a mixture of one part by weight oat protein and two parts by weight soy protein concentrate. Again, an acceptable caseinate replacement is produced.

EXAMPLE 9

Example 1 is repeated except the modified plant protein material is a mixture of one part by weight sesame seed protein and three parts by weight soy protein concentrate. Again, an acceptable caseinate replacement is produced.

EXAMPLE 10

Example 1 is repeated except the modified plant protein material is a mixture of one part by weight peanut protein and one part by weight soy protein concentrate. Again, an acceptable caseinate replacement is produced.

EXAMPLE 11

Example 5 is repeated except the modified plant protein material is a mixture of one part by weight sesame protein and three parts by weight soy protein concentrate. Again, an acceptable caseinate replacement is produced.

EXAMPLE 12

Example 5 is repeated except the modified plant protein material is a mixture of one part by weight peanut protein and three parts by weight soy protein concentrate. Again, an acceptable caseinate replacement is produced.

EXAMPLE 13

Example 1 is repeated with the exception that the unmodified protein is ground meat. Again, an acceptable product is produced, in which the binding characteristics of sodium caseinate are found.

EXAMPLE 14

Example 5 is repeated with the exception that the unmodified protein is ground meat. Again, an acceptable product is produced.

EXAMPLE 15

Example 6 is repeated except the unmodified protein is ground meat. Again, an acceptable product is produced.

EXAMPLE 16

Example 7 is repeated with the exception that the unmodified protein is ground meat. Again, an acceptable product is produced.

EXAMPLE 17

Example 8 is repeated with the exception that the unmodified protein is ground meat. Again, an acceptable product is produced.

EXAMPLE 18

Example 9 is repeated with the exception that the unmodified protein is ground meat. Again, an acceptable sodium caseinate replacement is produced.

EXAMPLE 19

Example 10 is repeated with the exception that the unmodified protein is ground meat. Again, an acceptable caseinate replacement is produced.

EXAMPLE 20

Example 11 is repeated with the exception that the unmodified protein is ground meat. Again, an acceptable sodium caseinate replacement is produced.

EXAMPLE 21

Example 12 is repeated with the exception that the unmodified protein is ground meat. Again, an acceptable sodium caseinate replacement is produced.

While it is not desired to be bound by any particular theory covering the operation of this invention, nevertheless, the following postulate is offered in relation to the use of the peroxide.

We believe the alkali treatment induces at least two types of reactions that contribute towards the objectionable flavor, odor and color of the treated slurry. It is believed that one of these reactions involves the alkali metal carbonates acting on the sulfur-containing amino acids in a protein thereby producing a number of low molecular weight sulfur containing compounds such as hydrogen sulfide and thiols. These compounds and others produced through secondary reactions are normally volatile and impart unacceptable flavor and color to the protein. We further believe that the other reaction occurs in the presence of alkali and at elevated temperatures. Under these conditions proteins react with carbohydrates to produce chemical compounds that impart brown color and objectionable flavor. The compounds produced in both reactions are mostly reducing compounds. Since peroxides are potent oxidizing agents, we believe that a reaction between the peroxide and the reducing compounds from the alkali treatment takes place causing oxidation of compounds that are responsible for objectionable flavor and color. The volatile compounds are removed by evaporation under vacuum while the compounds responsible for color are oxidized to colorless compounds by the peroxide.

Having fully described this new and unique invention, we claim:

1. A process for producing a proteinaceous mixture of modified plant protein and unmodified protein, said mixture having thermoplastic and forming properties similar to casein and caseinate salts, said process comprising:
   a. making an aqueous slurry of a plant protein material, said plant protein materials containing steam volatile flavor components and at least about 30 percent by weight protein, said slurry having a solids content of from about 3 percent to about 18 percent by weight;
   b. adjusting the pH of the aqueous slurry to a pH in the range of from about 7.0 to about 10.5 by addition thereto of an alkali metal carbonate;
   c. reacting the alkali metal carbonate with the plant protein by heating the aqueous slurry to a temperature in the range of from 280° F. to 370° F. for from 2.5 to 5 minutes;
   d. cooling the reacted protein slurry to a temperature below 130° F.;
   e. adding from 0.3 percent to about 1.5 percent by weight peroxide to the slurry, said peroxide being a member selected from the group consisting of hydrogen peroxide, sodium peroxide, potassium peroxide, calcium peroxide, and magnesium peroxide;
   f. mixing the peroxide containing slurry;
   g. neutralizing the slurry to a pH within the range of from 6.6 to 7.0 by addition thereto of an edible acid;
   h. thereafter, removing the steam volatile flavor components from the slurry by heating the slurry;
   i. drying the neutralized slurry to remove a substantial portion of the water therein; and
   j. admixing from 1 to 15 parts by weight of the substantially dried neutralized slurry with from 1 to 30 parts by weight proteinaceous material not having been modified by reaction with an alkali metal carbonate.

2. A process as in claim 1 wherein the steam volatile flavor components are removed from the slurry by heating the slurry under a vacuum.

3. A process as in claim 2 wherein the steam volatile flavor components are removed from the slurry by heating the slurry to a temperature sufficient to accomplish boiling under a vacuum in the range of from 15 inches to 30 inches.

4. A process as in claim 1 wherein the plant protein material is selected from the group consisting of oat protein and oil seed vegetable protein.

5. A process as in claim 1 wherein the alkali metal carbonate in the slurry is reacted with the protein by heating the aqueous slurry to a temperature of from 295° F. to 310° F. in a closed vessel for from 3.5 to 5.0 minutes.

6. A process as in claim 1 wherein the plant protein material is a solvent extracted oil seed vegetable protein.

7. A process as in claim 1 wherein the aqueous slurry has a protein content of up to about 12 percent by weight.

8. A process as in claim 1 wherein the alkali metal carbonate is a member selected from the group consisting of sodium carbonate, sodium bicarbonate, potassium carbonate, and potassium bicarbonate.

9. A process as in claim 1 wherein the plant protein is soy protein isolate.

10. A process as in claim 1 wherein the plant protein material is an oat protein.

11. A process as in claim 1 wherein the slurry is neutralized immediately after the protein in the slurry is reacted with the alkali metal carbonate.

12. A process for producing a proteinaceous mixture of modified plant protein and unmodified protein, said mixture having thermoplastic and forming properties similar to casein and caseinate salts, said process comprising:
   a. making an aqueous slurry of a plant protein material, said plant protein material containing steam volatile flavor components and at least about 30 percent by weight protein, said slurry having a solids content of from about 3 percent by about 18 percent by weight;
   b. adjusting the pH of the aqueous slurry to a pH in the range of from about 7.0 to about 10.5 by addition thereto of an alkali metal carbonate;
   c. reacting the alkali metal carbonate with the plant protein by heating the aqueous slurry to a temperature in the range of from 280° F. to 370° F. for from 2.5 to 5 minutes;
   d. adding from 0.3 percent to about 1.5 percent by weight peroxide to the slurry, said peroxide being a member selected from the group consisting of hydrogen peroxide, sodium peroxide, potassium peroxide, calcium peroxide, and magnesium peroxide;

e. mixing the peroxide containing slurry;

f. neutralizing the slurry to a pH of from 6.6 to 7.0 by addition thereto of an edible acid;

g. thereafter, removing the steam volatile flavor components from the slurry by heating the slurry under a vacuum;

h. drying the neutralized slurry to remove a substantial portion of the water therein; and i. admixing from 1 to 15 parts by weight of the substantially dried neutralized slurry with from 1 to 30 parts by weight proteinaceous material not having been modified by reaction with an alkali metal carbonate.

13. A process for producing a proteinaceous mixture of modified plant protein and unmodified protein, said mixture having thermoplastic and forming properties similar to casein and caseinate salts, said process comprising:

a. making an aqueous slurry of a plant protein material, said plant protein material containing steam volatile flavor components and at least about 30 percent by weight protein, said slurry having a solids content of from about 3 percent to about 18 percent by weight;

b. adjusting the pH of the aqueous slurry to a pH in the range of from about 7.0 to about 10.5 by addition thereto of an alkali metal carbonate;

c. reacting the alkali metal carbonate with the plant protein by heating the aqueous slurry to a temperature in the range of from 280° F. to 370° F. for from 2.5 to 5 minutes;

d. cooling the reacted protein slurry to a temperature below 130° F.;

e. adding from 0.3 percent to about 1.5 percent by weight peroxide to the slurry, said peroxide being a member selected from the group consisting of hydrogen peroxide, sodium peroxide, potassium peroxide, calcium peroxide, and magnesium peroxide;

f. mixing the peroxide containing slurry;

g. neutralizing the slurry to a pH within the range of from 6.6 to 7.0 by addition thereto of an edible acid;

h. thereafter, removing the steam volatile flavor components from the slurry by heating the slurry; and i. admixing from 1 to 15 parts by weight of the substantially dried neutralized slurry with from 1 to 30 parts by weight proteinaceous material not having been modified by reaction with an alkali metal carbonate.

* * * * *